Patented May 4, 1926.

1,583,421

UNITED STATES PATENT OFFICE.

GUSTAV PISTOR AND HERMANN S. SCHULTZE, OF GRIESHEIM-ON-THE-MAIN, AND HEINRICH REITZ, OF BITTERFELD, GERMANY, ASSIGNORS TO THE CHEMISCHE FABRIK GRIESHEIM-ELEKTRON, OF FRANKFORT-ON-THE-MAIN, GERMANY.

PRODUCING CALCIUM HYPOCHLORITE COMPOUNDS.

No Drawing. Application filed November 4, 1922. Serial No. 599,152.

To all whom it may concern:

Be it known that we, GUSTAV PISTOR and HERMANN S. SCHULTZE, both citizens of Germany, and residing at Griesheim-on-the-Main, Germany, and HEINRICH REITZ, a citizen of Germany, and residing at Bitterfield, Germany, have invented certain new and useful Improvements in Producing Calcium Hypochlorite Compounds, of which the following is a specification.

This invention relates to the production of basic calcium hypochlorite compounds from chlorine, slaked lime and water. In our pending application Sr. No. 494,860 a process for producing basic hypochlorite compounds is described according to which products of different basicity are obtained by chlorinating lime in water, separating the solid bodies from the mother-liquor and drying them. Such products are of extraordinary value owing to their great stability. In this process the proportions of the lime and chlorine employed or the composition of the precipitated basic hypochlorite compounds must be continuously controlled in order to determine the moment where the further introduction of chlorine is to be stopped in view of obtaining a determined product. We have found that by conducting the chlorinating process in a determined direction based on a characteristic behaviour of the percentage of the active chlorine in the mother-liquor we are able to produce on a large scale and with satisfactory yield said basic hypochlorite compounds of well defined character or a mixture of such compounds with neutral hypochlorite, such products being distinguished by excellent properties compared with the products of the type of ordinary bleaching powder.

In carrying out our improved process we may proceed for instance as follows:—

Slaked lime and water are treated with chlorine in the usual way, the temperature being allowed to rise to a moderate extent. After some time a solid body of basic character begins to precipitate which contains the active chlorine that was introduced, so that the proportion of active chlorine contained in the mother liquor diminishes. The introduction of chlorine is now continued until the proportion of active chlorine in the mother liquor begins to increase again. This reversing or minimum point is coinciding with the moment when crystals exclusively of dibasis hypochlorite are found to form the precipitated body. Hereupon the introduction of chlorine is stopped. The solid product is easily separated from the mother liquor by sucking, centrifugating or pressing, and the separated mass is then dried. It is remarkable that the drying can be effected at elevated temperatures, such for instance at 100° C. and more without any losses of chlorine being involved.

According to the above directions a product is obtained the composition of which corresponds to the formula

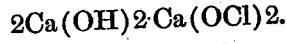

The microscopic test shows the precipitate as being constituted of well-formed hexagonal crystals whereby the product is confirmed to be a uniform chemical compound.

When the mass containing the dibasic body (which may be of paste-like consistency) is further treated with chlorine, the proportion of active chlorine in the mother proportion will increase to a certain point, whereupon it will again decrease. Now when the chlorinating process is continued until the proportion of active chlorine in the mother liquor again increases, a precipitate is obtained consisting almost uniformly of monobasic calcium hypochlorite

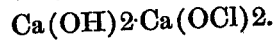

This precipitate is obtained in the form of needle-shaped crystals and the microscopic test proves likewise its uniformity. The further treatment of the monobasic salt is carried out corresponding to that of the dibasic one. Finally, on treating the monobasic salt with chlorine in its mother-liquor, the percentage of active chlorine in the said mother-liquor will increase again to a certain point and then decrease, neutral hypochlorite being formed in a solution of calcium chloride.

According to the present invention it will be possible to produce dibasic and monobasic calcium hypochlorites in a simple manner far superior to the known or common process of manufacturing bleaching-powder. For instance, our process may be carried out by means of completely closed apparatus which are far more compendious than the usual plant for making bleaching-powder, such apparatus presenting the further advantage that the workers are not incommoded by chlorine gas and dust. The products obtained by our process are by far superior to common bleaching-powder, in so far as their contents of active chlorine and, more especially, their stability are concerned. Furthermore, they are of greater stability and better manageable than neutral calcium hypochlorite; they are even of excellent stability against elevated temperatures and moist air. The process disclosed by the present invention accomplishes a considerable advance in the manufacture of bleaching substances, inasmuch as uniform products are obtained in a simple manner of manufacturing and with satisfactory yield, such products always containing the same proportion of active chlorine and being distinguished by high and constant stability and always equally well adapted to be filtered off.

When we do not intend to wait for the moment where the percentage of active chlorine in the mother-liquor attains its minimum point, of course mixed products are obtained containing more or less proportions of the former product and the final product according as the minimum point will be more or less attained. In this manner, determined mixtures of the two products or of monobasic with neutral hypochlorites are obtained, that is to say mixtures containing any desired proportion of active chlorine.

The formation of uniform basic salts is bound to a determined concentration of active chlorine in the mother liquor, but this determined concentration is somewhat variable in itself inasmuch as it depends on the concentration of the calcium chloride contained in the mother liquor, that is to say on the concentration of the mixture of slaked lime and water originally employed. For instance when starting from a mixture of 30 parts by weight of lime with 70 parts by weight of water the active chlorine in the mother liquor will amount to 42 grams per liter at the "first minimum point," whilst such amount will be 55 grams when starting from a mixture of 27 parts of lime and 73 parts of water.

What we claim as our invention and desire to secure by Letters Patent is:—

1. Process for regulating the percentage of active chlorine in the production of basic calcium hypochlorite compounds from chlorine, slaked lime and water which process consists in conducting the chlorination of the slaked lime according to the percentage of active chlorine in the mother-liquor in such a manner that the chlorination is stopped at the moments when the percentage of active chlorine in the mother-liquor has attained a minimum whereby a precipitate of a uniform substance is formed.

2. The process of manufacturing dibasic calcium hypochlorite, consisting in treating a mixture of slaked lime and water with chlorine until basic salt is precipitated, continuing the introduction of chlorine as long as the percentage of active chlorine in the mother-liquor is decreasing, stopping the chlorination when said percentage begins to increase and thereupon removing the mother-liquor and drying the remaining crystals.

In testimony whereof we affix our signatures.

GUSTAV PISTOR.
HERMANN S. SCHULTZE.
HEINRICH REITZ.